(12) United States Patent
Gleason et al.

(10) Patent No.: US 6,271,156 B1
(45) Date of Patent: Aug. 7, 2001

(54) FIRE-RESISTANT CORE FOR A COMBUSTIBLE FIRE-RATED PANEL

(75) Inventors: James R. Gleason, Niskayuna; John E. Minnick, Latham, both of NY (US); Scott E. Dempsey, Doylestown, PA (US); Philip J. Chadderdon, Clifton Park, NY (US)

(73) Assignee: Lydall, Inc., Manchester, CT (US)

( * ) Notice: Subject to any disclaimer, the term of this patent is extended or adjusted under 35 U.S.C. 154(b) by 0 days.

(21) Appl. No.: 09/158,069

(22) Filed: Sep. 22, 1998

(51) Int. Cl.[7] .............................. B32B 21/10; B32B 5/16
(52) U.S. Cl. ...................... 442/413; 442/414; 442/417
(58) Field of Search ..................................... 442/413, 414, 442/417

(56) References Cited

U.S. PATENT DOCUMENTS

| | | |
|---|---|---|
| 4,075,804 | 2/1978 | Zimmerman . |
| 5,045,385 | 9/1991 | Luckanuck . |
| 5,130,184 * | 7/1992 | Ellis ..................................... 428/245 |
| 5,171,366 | 12/1992 | Richards et al. . |

* cited by examiner

*Primary Examiner*—Elizabeth M. Cole
*Assistant Examiner*—Ula C. Ruddock
(74) *Attorney, Agent, or Firm*—Birch, Stewart, Kolasch & Birch, LLP

(57) ABSTRACT

A fire-resistant core for use in a combustible fire-rated building panel (1), such as a fire door, has a wood product-containing solid structural member (20) with a density of between about 30 and 60 lbs. per cubic foot and a thickness between about 1/16 inch and two inches. At least one layer of fire-resistant composite (21) is attached to at least a lateral surface (22) of the structural member (20). The composite has an inorganic, non-woven fibrous web (25) with a thickness of from about 5 to 50 mils. A web binder is substantially uniformly dispersed throughout the web (25). A substantially continuous coating (27) is on at least a lateral surface (28) of the web (25). The coating is of particulate vermiculite (29) and has a thickness of from about 0.5 to 10 mils and the add-ons of the vermiculite to the web are from about 10% to 50%.

30 Claims, 2 Drawing Sheets

FIRE-RESISTANT CORE FOR A COMBUSTIBLE FIRE-RATED PANEL

The present invention relates to a fire-resistant core for use in combustible fire-rated building structures, and more particularly to a core for producing panels for building structures.

BACKGROUND OF THE INVENTION

Fire-rated panels are used as building structures in a variety of applications, including roof panels, wall panels and fire doors. While the fire-rated panel will vary somewhat for the particular application involved, e.g. a roof panel or wall panel or fire door, all of these fire-rated panels have in common the ability to prevent burn-through of fire, under standard test conditions, for a minimum length of time.

There are two primary types of fire-rated panels, i.e. a non-combustible panel and a combustible panel. The non-combustible panel is made of inorganic materials, e.g. steel, fiberglass, mineral and gypsum board, and the like. Typically, a non-combustible panel comprises two sheet steel faces which sandwich therebetween some insulating material, such as fiberglass. Since none of the materials of the panel are combustible, i.e. the materials are all inorganic materials, these panels are referred to the art as non-combustible panels. The other type of fire-rated panel is referred to in the art as a combustible panel and is made of, at least in part, combustible materials, e.g. wood or wood products.

Non-combustible panels have decided disadvantages. Firstly, such panels, with or without fiberglass insulation between the sheet steel faces, are very heavy and are very difficult to render in an aesthetically pleasing manner. While such panels may be painted, or likewise decorated, such steel panels very often do not fit into decorative schemes for buildings. Accordingly, non-combustible fire-rated panels are generally limited to uses in industrial structures.

The fire-rated combustible panels, typically, will have outer faces of wood, wood veneer or plastic sheets simulating wood grain, or the like, and can be made to have a quite satisfactory aesthetic appearance and fit within decorating schemes. However, since the combustible panels will combust, the fire rating provided to these panels is, primarily, a result of a fire resistant core disposed between the outer faces of the combustible fire-rated panel.

As can be appreciated, since the fire-resistant core is the essential element for achieving a fire rating in combustible fire-rated panels, the art has expended considerable effort in providing fire-resistant core materials for the combustible fire-rated panels, and this effort has been particularly acute in connection with combustible fire-rated panels used as fire doors. Fire doors present additional problems, beyond those problems inherent in the use of the fire-rated panels for other applications, e.g. wall panels and roof panels.

In this latter regard, whether the panel is used as a roof panel, a wall panel or a fire door, the panel will require some attachment to some supporting structure. For example, wall panels require attachment to conventional wall studs and roof panels require attachment to supporting roof structures. When the panels are used as fire doors, those doors not only require attachment to the supporting structure, e.g. the door frame, but the doors must also have attached thereto associated hardware, such as lock sets, hinges, panic bars and the like. Since the fire-resistant core is normally made of an inorganic, non-combustible material, for example, gypsum board, considerable difficulty has been experienced in the art in mounting the necessary hardware to the door. This is because the non-combustible cores of such doors, generally, have very poor fastener-holding properties, e.g. sufficient properties for holding screws, nails, bolts and the like. As a result, with combustible fire-rated doors, special efforts have been required to provide increased fastener-holding properties, which is not normally common to other uses of the fire-rated panel, e.g. the wall and roof panels.

In view of the foregoing, while the invention is fully applicable to use with combustible fire-rated panels in general, in view of the special problems of fire doors, and to be more concise, the invention will be described hereinafter in connection with the embodiment of a combustible fire-rated door.

Typically in past prior art, the fire-resistant core was made with asbestos. Various compositions of asbestos were proposed in the past prior art, but with the advent of health concerns in connection with asbestos, the art sought substitutes for the past asbestos-containing fire-resistant cores. U.S. Pat. No. 4,075,804, issued to Zimmerman, proposed a combustible fire-rated door, or other like panel, as described above, which is free of asbestos. That patent proposed providing a fire-resistant core material where a slurry of ingredients is poured into a horizontal mold and cured in an autoclave, similar to the manner in which the past asbestos-containing fire resistance cores were made. However, instead of using asbestos fibers in that slurry, that patent suggests substituting for the asbestos fibers a combination of vermiculite, sisal fibers and fiberglass. Calcium silicate, which is a binder for the ingredients, is also used in that composition, in the same manner in which it was used in connection with the past asbestos-containing fire-resistant cores. However, although this core does not contain asbestos, it does suffer from the same disadvantages as the past fire-resistant cores made with asbestos in that it has very poor fastener-holding properties, and special provisions, as explained more fully below, are required for use of that core in producing fire-rated doors.

U.S. Pat. No. 5,045,385, issued to Luckanuck, proposed an improvement, wherein the slurry from which the cores were cast included wood chips and a curable phenolic resin. This provides greater rigidity to the core, so as to avoid inadvertent breaking or cracking of the cast cores during handling and manufacture of doors, and the wood chips considerably improved the fastener-holding properties, referred in the art as "screw holding power". However, the screw holding power of that core is still unacceptable for door use, and special provisions are required for mounting hardware to such a fire-rated door.

U.S. Pat. No. 5,171,366, issued to Richards et al, proposes a similar core to that proposed by Luckanuck, but instead of wood chips, proposes a combination of calcium sulfate and pulp paper fibers. The screw holding power of that core is increased, but, again, the screw holding power is not sufficient that fire doors can be made without special provisions.

In this latter regard, the special provisions typically used for making combustible fire-rated doors with conventional fire-resistant cores includes cutting the core where hardware is to be mounted, e.g. hinges, lock sets, panic bars and the like, and replacing those cut portions with dense materials which have much greater screw holding power. A number of such dense materials have been proposed by the art and are presently routinely used in producing combustible fire-rated doors. This, however, requires considerable labor in cutting the core and replacing those cut portions with the dense materials. Further, hardware can be mounted only where those dense materials have replaced the core. Thus, a door must be specially manufactured for specific hardware, and this considerably reduces interchangeability of such fire-rated doors and causes difficulties in the production thereof. Also, replacing the fire-resistant core with these dense materials creates a discontinuity where the dense materials replace the core and can cause difficulties in preventing burn-through of the fire.

Accordingly, it would be of a substantial advantage to the art to provide a fire-resistant core for combustible fire-rated panels, especially fire doors, which has screw holding power throughout the entire core which is more than sufficient to retain hardware or other fastening devices at any place on the panel. It would be a further advantage to the art to provide such a core which provides increased rigidity of the panel, and especially a fire-rated door, and which core can be inexpensively made and can be accommodated in automatic processes for producing the fire-rated panels, especially fire-rated door, and which do not require any special labor or dense inserts.

BRIEF SUMMARY OF THE INVENTION

The invention is based on several primary discoveries and several subsidiary discoveries.

As a primary discovery, it was found that the fire-resistant core may have a wood product-containing solid structural member, for example, wood or wood particle board or wood fiber board. Such wood product-containing structural member has exceedingly high screw holding power, and therefore obviates the problems of screw holding power in connection with prior art cores. As a subsidiary discovery in this regard, it has been found that such wood product-containing structural member may extend throughout the entire length and width of the core, thus, allowing the mounting of hardware in a variety of manners at a variety of places and at a variety of times. No dense inserts or the like are required for the present core in view of the wood product-containing structural member forming that core.

However, it is quite apparent that the wood product-containing structural member, being a combustible material, will not provide the required fire rating to the door. Therefore, as a second primary discovery of the invention, it was found that a fire-resistant composite may be attached to at least a lateral surface of the wood product-containing structural member. That composite is made of an inorganic, non-woven fibrous web having a binder therein and a substantially continuous coating on at least a lateral surface of the web of a particulate inorganic mineral, particularly vermiculite. That coating on the web of particulate vermiculite will normally but not necessarily face a direction of fire. The coating of the vermiculite presents such a fire-resistant surface that even though the wood product-containing structural member is quite combustible, the vermiculite coating on the web will so sufficiently protect that structural member from combustion that a fire-rated door of at least a 45-minute burn rating can be provided (the rating being explained hereinafter).

Since combustible fire-rated doors are intended, primarily, for use where the aesthetics of the door are important, this means that the door must fit within conventional door frames and jambs. To do so, the fire-rated door can only be of maximum thicknesses. However, the wood product-containing structural member must be of substantial thickness in order to provide sufficient screw holding power. This means that the above-noted composite, which protects that structural member, must be very thin, in order for the entire fire-rated door to fit within conventional jambs and frames. Thus, as a subsidiary discovery of the invention, it has been found that the composite can be very thin, i.e. with the inorganic, non-woven fibrous web having a thickness of from about 5 to 50 mils and the coating of vermiculite thereon having a thickness of from about 0.5 to 10 mils. Accordingly, in total, the thickness of the composite can be from as little as 5.5 mils up to as much as 60 mils. This is, of course, a very thin composite and, thus, allows considerable thicknesses of the wood product-containing structural member to increase screw holding power.

As another subsidiary discovery, it has been found that in addition to the coating of vermiculite on the web, there is some advantage to providing some small amounts of particulate vermiculite dispersed into the web. For that purpose, as well as for the purpose of providing a substantial coating of vermiculite, it has also been found that the web should have about 10 to 50%, by weight, add-ons of the vermiculite. Most of those add-ons will be in the vermiculite coating, but small portions thereof will be dispersed throughout the web.

With the above fire-resistant core, fire-rated doors can be made in an automated manner, since there is no need for special dense inserts or provisions to provide increased screw holding power, as in prior art cores and as briefly discussed above.

Further, the present core can be made with a very simple process, as opposed to the process of the prior art cores, and as briefly discussed above. The present core can be made simply by attaching, e.g. laminating, the composite to the wood product-containing structural member. This attachment can be by usual mechanical attachment devices, e.g. staples and the like, or can simply be by use of a conventional adhesive to form a laminate. The composite itself can be very easily made by applying to a lateral surface of the web (the web being commercially available) a liquid dispersion of particulate vermiculite to form a coating on the web. The coated web is passed through a doctor means, where the coating is reduced in thickness to somewhere in the range of the final coating, as noted above, and some quantity of the dispersion passes into the web, for the reason noted above. That so-coated web is simply then dried so as to stabilize and set the coating. The coating is then firmly adhered to the web, and the web can then be applied to the structural member in a manner described above.

Thus, briefly stated, the invention provides a fire-resistant core for use in a combustible fire-rated building panel. The core comprises a wood product containing solid structural member having a density of between about 30 and 60 lbs. per cubic foot and a thickness between about ¹⁄₁₆ inch and two inches. At least one layer of a fire-resistant composite is attached to at least a lateral surface of the structural member. The composite comprises an inorganic, non-woven fibrous web having a thickness of from about 5 to 50 mils. A web binder is substantially uniformly dispersed throughout the web. There is a substantially continuous coating on at least a lateral surface of the web of particulate vermiculite. That coating has a thickness of from about 0.5 to 10 mils and the add-ons of the vermiculite to the web are from about 10% to 50% by weight.

There is also provided a method for producing the core, described above. To a lateral surface of the web is applied a liquid dispersion of particulate vermiculite to form a coating on the web. The so-coated web is passed under a doctor means, where the coating is reduced in thickness and some quantity of the dispersion is passed into the web. Thereafter, the so-coated web is dried to set and stabilize the coating.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF PREFERRED EMBODIMENTS

Figure 1:
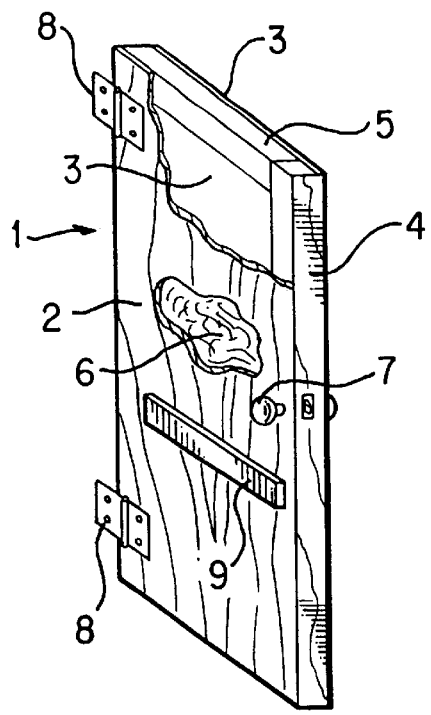
FIG. 1 is an isometric view of a conventional combustible fire-rated door, partially broken away to show details thereof.
Figure 2:
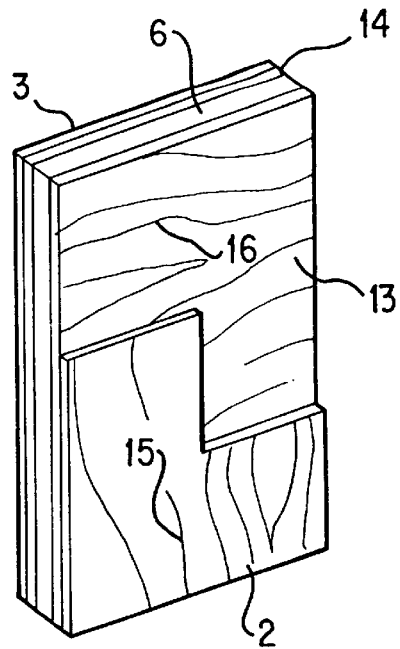
FIG. 2 is an isometric view of a typical arrangement of the components of a combustible fire-rated door, including the fire-resistant core thereof.
Figure 3:
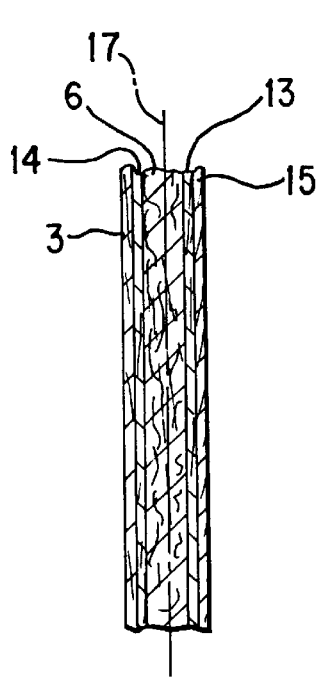
FIG. 3 is a partial cross-section of FIG. 2.

To further elucidate the prior art, reference is made to FIGS. 1 through 3, which figures in part show prior art and in part show the present invention. FIG. 1 is specific to the prior art and shows, generally, a fire-rated panel, generally, 1 which has been rendered, in this particular embodiment, as a panel useful as a combustible fire-rated door. Whether the panel is used as a door or as a roof panel or as a wall panel, the following features are applicable. That panel has an outside face 2 and an inside face 3. Rigidity is provided to the panel by way of stiles 4 and rails 5. The arrangement of conventional stiles and conventional rails can vary from panel to panel, depending upon the rigidity and security required. However, for a typical fire door, there would be top and bottom rails 5 and stiles 4 at each edge of the door. The rails and stiles are typically made of wood, e.g. a hard wood, or made of a wood product such as a wood product described in more detail below in connection with the wood product-containing structural member of the present core, e.g. particle board. Between the outside face 2 and the inside face 3, some sort of fire-resistant insulation 6 (a flame barrier) is disposed. That fire-resistant insulation is referred to as the "core" and that term is used herein.

In the case of a door, the door must also be fitted with appropriate hardware, such as lock set 7, hinges 8 and panic bar 9. Other hardware may be appropriate for particular fire doors, such as security rods and the like.

More usually, such a combustible fire-rated door will have in addition to outside face 2 and inside face 3 (see FIG. 2) a wooden cross banding 13 and a wooden cross banding 14, usually made of plywood or veneer. The grain 15 of the wooden face 2 is generally at a 90° angle to the grain 16 of wooden cross banding 13, so that, by way of the opposite grain orientations, buckling and other deformation of the door is avoided. A similar wooden cross banding 14 with opposite grain to the grain in the wooden inside face 3 is provided. Sandwiched between the cross bandings 13 and 14 is a core 6. As can be best seen from FIG. 3, the door is symmetrical about centerline 17 of the door. Doors, generally, must be made symmetrical so that there is uniform moisture transmission throughout the door. If the moisture transmission were not uniform, excess moisture on one side of the door and deficient moisture on the other side of the door could cause warpage of the door.

While there are a number of conventional variations from the typical door discussed above, it is common to all of these doors to have a fire-resistant core 6. It is in connection with that fire-resistant core that the present invention centers.

Figure 4:
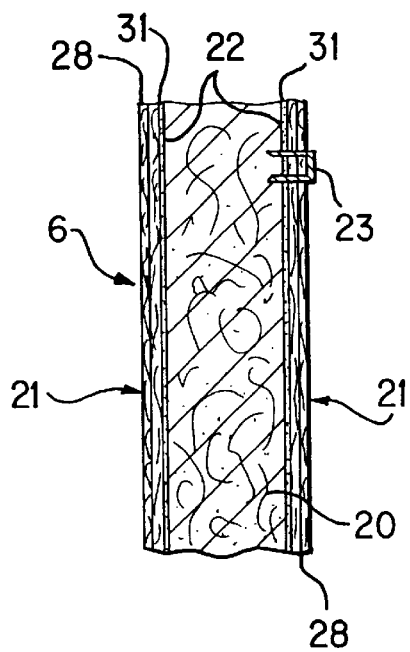
FIG. 4 is a partial cross-sectional view of an embodiment of the core of the present invention.

FIGS. 4, 5, 6A and 6B show the present core, or parts thereof, in a partial cross-sectional view. In FIG. 4, there is shown a core, generally, 6, which has a wood product-containing solid structural member 20. That structural member 20 will have a density between about 30 and 60 lbs. per cubic foot. Such density in a wood product-containing solid structural member provides very high screw holding power. Since that core extends throughout the panel, as shown in FIG. 2, screws and other fasteners can be attached to the panel at any desired place and at any desired time. Indeed, any kind of hardware can be so attached at any desired place on the panel when the panel is being installed, e.g. hinges 8, lock set 7, panic bars 9 (see FIG. 1), or any other like hardware, such as security rods or floor and joist lock sets. To provide acceptable screw holding power, the thickness of that structural member should be at least 1/16 inch and can be up to two inches thick. That structural member cannot practically exceed two inches in thickness, since, if it were of greater thickness than two inches, after the present composite is applied thereto, as explained below, and after the outside and inside faces 2 and 3, as well as the cross bandings 13 and 14 are applied, the total thickness of the door would exceed the thickness of usual door frames and jambs. That could make the door less than satisfactory from a practical point of view. Thus, while there is no theoretical upper limit on the thickness of the structural member, the two-inches thickness is a practical limitation.

The density of 30 lbs. per cubic foot is a lower density as far as screw holding power is concerned, and it is preferred that that density be at least about 32 lbs. per cubic foot. Further, the 60 lbs. per cubic foot density tends to make the door heavier than necessary and provides more than necessary screw holding power. The preferred higher density is, therefore, about 40 lbs. per cubic foot. Accordingly, a preferred range for the density of the structural member is from about 32 to about 40 lbs. per cubic foot.

Also, for practical screw holding power, and for making the door lighter, the thickness of the structural member should be greater than 1/16 inch, i.e. at least 1/4 inch, but not greater than 1½ inches. Therefore, the preferred range of the thickness of the structural member is from about 1/4 inch to about 1½ inches.

As noted above, the structural member 20 may be made of wood, but solid wood is fairly expensive. Wood particle board, wood fiberboard, oriented strand wood board and timberstrand lumber are all less expensive than wood and have more than adequate screw holding power. Thus, any of these wood products may be used as the structural member, as well as for the stiles and rails.

As shown in FIG. 4, at least one layer of fire-resistant composite, generally 21, is attached to at least one lateral surface 22 of structural member 20. In FIG. 4, a composite 21 is attached to each lateral surface 22 of structural member 20 so as to provide a symmetrical fire door, for the reasons explained above.

Figure 5:
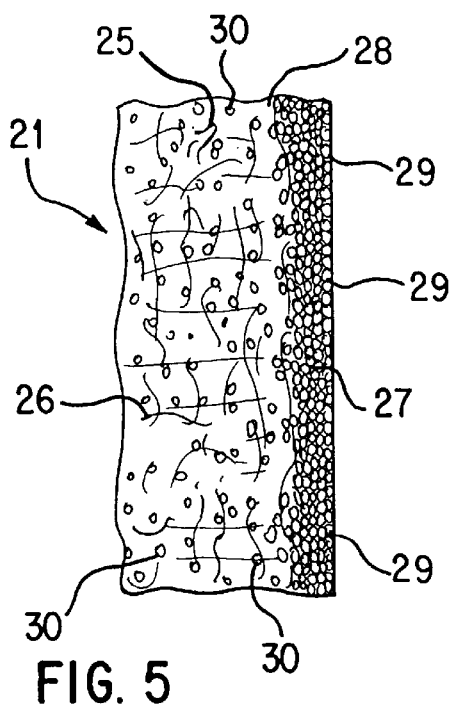
FIG. 5 is a partial cross-sectional view of the composite of the invention.

The composite is shown in diagrammatic enlarged scale in FIG. 5. That composite has an inorganic, non-woven fibrous web 25. That web is quite thin, for the reasons explained above, and generally has a thickness of from about 5 to 50 mils. The web is made of inorganic fibers 26. The fibers may be made of one or more of glass fibers, mineral wool fibers, quartz fibers, metal fibers, graphite fibers and ceramic fibers. Each of these fibers are inorganic and are not combustible. However, as will be explained in more detail below, it is necessary to achieve a coating, substantially, on the surface of that web 25. The composition of that web has an effect on the ability to so coat the web. Some fibers more readily wet with the dispersion of particulate vermiculite to form the coating than other fibers. Also, some fibers allow greater or less penetration of the dispersion, and, hence, ultimate placement of the particulate vermiculite within the web, than do other fibers. For these reasons, it is preferred that the fibrous web is made of glass fibers. It has also been found that when the glass fibers have a diameter of from about 1 to about 16 microns and a length from about ¼ inch to about 1¼ inch, the web has good strength, allows a firm and well-adhered continuous coating of the particulate vermiculite on the surface of the web, and allows desired penetration of some small quantity of the particulate vermiculite into the web. Thus, glass fibers of this nature appear to be ideal as the fibers of the web.

The web should be as thin as possible, consistent with providing a good coating of the vermiculite thereon. This, in turn, either allows a thinner overall door or a greater thickness of the structural member. Particularly, when glass fibers are used as the web fibers, as explained above, the web can have a thickness of 15 to 25 mils and very adequately perform its function, it is apparent that instead of a non-woven fibrous web, a woven fibrous web could be used. While for some applications, especially lower fire-rated wall panels, a woven web may be used, woven webs cannot contain substantial amounts of in-web vermiculite and cannot tightly adhere to thicker coatings of vermiculite. Thus, the use of a woven web will not allow the production of a "standard" composite, as explained in more detail below. It is for this reason that a non-woven web is used.

The web will have a polymeric binder therefor. This binder holds the fibers into a very handleable web, so that the web can be processed, as described hereinafter, without breaking, tearing, crinkling or the like. Generally, the web binder is a synthetic organic polymeric binder, and especially useful are one or more of polyvinyl alcohol, polyvinyl acetate, ethylene vinyl acetate, polyacrylics, epoxy resins, polystyrene, polystyrene butadiene and amino resins. The binder can be water soluble or water dispersible, but it is convenient for the binder to be water soluble. The binder can be added directly to the fibrous composition which is formed into the web by standard "paper" making machines, or the binder can be applied to an already-formed web. A preferred water-soluble binder, in this regard, is polyvinyl alcohol. With the water-soluble polyvinyl alcohol being used in the water dispersion of the fibers for making the fibrous web in a "paper" making machine, it can be ensured that the web binder is substantially uniformly dispersed throughout the web. When the binder is applied to an already-formed web, the water solution of the binder is easily applied to the web with conventional impregnating devices.

There is a substantially continuous coating 27 on at least a lateral surface 28 of the web 25 of particulate vermiculite 29. That coating 27 has a thickness from about 0.5 to 10 mils, but more preferably has a thickness from about 1 to about 5 mils. Such thicknesses of coatings will give a burn-through time of at least 45 minutes, as explained more fully hereinafter.

In addition, as noted above, some small amount of particulate vermiculite is ideally disposed throughout the web 25 and such in-web particulate vermiculite 30 is shown in FIG. 5 with such dispersion. Some dispersion of the particulate vermiculite 30 throughout the web 25 increases the stiffness of the web and makes the web somewhat more handleable and rugged. In addition, that in-web particulate vermiculite 30 will slightly increase the burn-through time of the composite 21. The amount of particulate vermiculite 30 disposed throughout the web 25 can vary considerably, but, generally speaking, at least about 60% of the vermiculite will be disposed on the surface of the web and the remaining 40% of the vermiculite will be disposed throughout the web. More preferably, about 80% of the vermiculite will be disposed on the surface of the web, and even more preferably about 90%.

It is quite apparent that instead of providing a coating of vermiculite on the web, all of the vermiculite could be disposed in a relatively uniform manner throughout the thickness of the web as in-web vermiculite 30, and still present substantial vermiculite to a flame for fire-resistance purposes. However, it is difficult to uniformly disperse vermiculite throughout the web. Aside from that difficulty, the amount of vermiculite which can be contained in the thin web is less than that which can be coated on the thin web. Accordingly, while the web can be impregnated with the vermiculite, instead of coating the web with vermiculite, and still provide acceptable fire resistance, the coating on the web provides considerably greater fire resistance, and it is for this reason that the coated web is used.

The density of the vermiculite coating is also important. Therefore, the add-ons of the vermiculite to the web should be from about 10 to 50%, i.e. the weight of the web is increased by about 10 to 50% after the addition of the vermiculite, and on a dry basis. More preferably, however, that add-on will be between about 15% and 40%, and more ideally between about 20% and 30%.

While the non-woven web itself can be a felted, air-laid or wet-laid web, it is far preferable that the web be a wet-laid web. When a web is laid in a wet process, i.e. on a conventional paper-making machine, the fibers of the web are largely oriented in the plane of a porous surface against which the web is laid. That generally lateral orientation of the fibers provides considerable strength to the web in that lateral direction. Strength in the transverse direction is not as important as strength in the lateral direction, since, when applying the coating to the web, the web is pulled in the lateral direction. In addition, when the web is a wet-laid web, as noted above, a water soluble binder can be added to the water dispersion for forming the wet-laid web, if desired, although such introduction of the binder, while very convenient, is not required.

For most binders, an adequate amount of binder is an add-on of between 1% and 20%, but particularly, when the web is a wet-laid web and the binder is a water soluble binder, the amount of binder can be reduced, and generally speaking, add-ons to the web of binder in amounts of between about 4% and 10% by weight of the web are quite adequate. Since the binder is combustible, smaller amounts of binder are an advantage.

The strength of the web depends in part upon the binder and the weight of the web. The weight of the web reflects the amount of fibers in the web. For binder amounts as described above, the web will have quite adequate strength, in combination with the binder, when the weight of the web is between about 10 and 90 lbs. per 2880 square feet, but more usually, the web is quite adequate when the weight of the web is between about 23 and 85 lbs. per 2880 square feet.

The composite 21 can be attached to the structural member 20 by any convenient means, such as mechanical devices and adhesives. In FIG. 4, attachment is shown by conventional staples 23 and/or by an adhesive 31 to form a laminate of structural member 20 and composite 21. While any convenient adhesive may be used to form such laminate, since the adhesive plays no part in the composite other than physically laminating the composite to the structural member, preferred adhesives are one or more of phenolic, acrylic and olefin adhesives, which are inexpensive and easy to apply in a conventional manner.

Figure 6A:
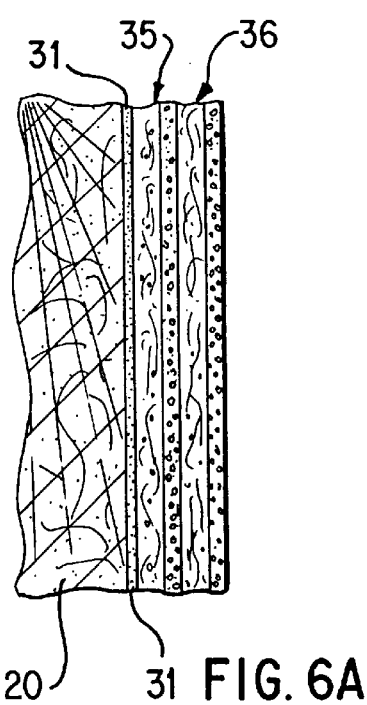
FIG. 6A is a partial cross-sectional view showing another embodiment of the core of the present invention.

Multiple layers of composite 21 may be adhered to the structural member 20. FIG. 6A shows two layers 35 and 36 laminated by adhesive 31 to structural member 20. However, up to about 10 such layers of the composite 21 may be used, although usually no more than one and especially no more than two layers are required. This is particularly true when there is a layer of composite 21 on each side of the structural member 20, as shown in FIG. 4. Multiple layers of composite 21 may be prepared by layering wet-laid layers upon wet-laid layers, before drying the layers, as explained below in connection with FIG. 7, or by adhering the layers together with an adhesive, such as adhesives 31 discussed above.

Figure 6B:
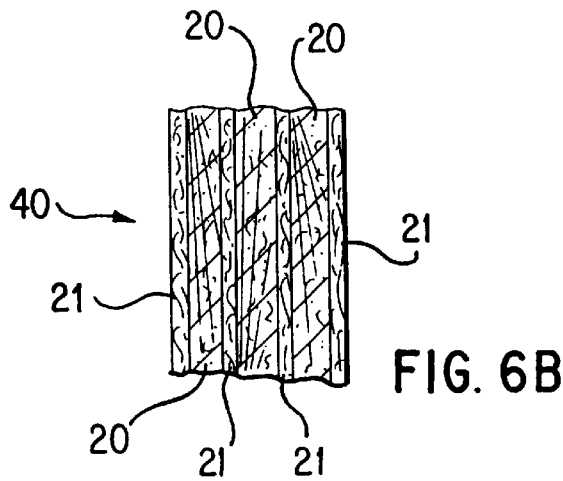
FIG. 6B is a partial cross-sectional view showing an alternative arrangement of FIG. 6A.

FIG. 6B shows an alternate arrangement of the use of multiple layers of composite 21 to that shown in FIG. 6A, and for some purposes, especially fire doors, the arrangement of FIG. 6B is preferred. As shown in FIG. 6B, a laminate, generally 40, of layers of structural member 20 and layers of composite 21, can be provided, although it is not necessary to provide a composite 21 on both outer surfaces of the laminate (FIG. 6B shows composite 21 on both outer surfaces). FIG. 6B shows the embodiment where there are alternating layers of structural member 20 and composite 21. However, other arrangements can be used, e.g. one layer of structural member 20 and two layers of composite 21, e.g. a laminate of layers of the arrangement of FIG. 6A. Of course, an adhesive must be used, such as adhesive 31, to form the laminate (the adhesive not shown in FIG. 6B).

In this arrangement, structural members 20 will be of less thickness, e.g. ½ inch, so that the total thickness of the laminated core is less than two inches, for the reasons explained above. A very good embodiment of the arrangement of FIG. 6B is where two structural members 20, instead of the three shown in FIG. 6B, of ¾ inch thickness are used.

One advantage of the arrangement of FIG. 6B is that a "standard" core can be made, e.g. with a thickness of the structural member 20 of ⅜ inch, and have one layer of composite 21 laminated thereto. Multiples of that "standard" core can be laminated together, as shown in FIG. 6B, to provide almost any fire rating desired for a particular fire-door application, e.g. a 45-minute, or 60-minute or 90-minute burn rating.

The particulate vermiculite used in coating the web can be any of the conventional vermiculites, but it is preferred that the vermiculite is in the form of high aspect ratio vermiculite platelets. This form of vermiculite is commercially available.

As noted above, the coating 27 can be of a particulate mineral, since minerals are non-combustible. While the coating could be made of a mineral or minerals, other than vermiculite, e.g. feldspar, kaolinite, etc., it has been found that vermiculite is highly advantageous, and it is for this reasons that vermiculite is used. Vermiculite, when dispersed in water, forms a slurry which is controllably coated onto the web (so as to form a predictable and uniform coating) and forms a tight, well-adhered coating when dried. As can be appreciated, if the coating is not well adhered, repeated slamming of a fire door would cause dislodgment of at least some of the coating and in places where significant amounts of the coating are dislodged, the fire resistance of the composite will be reduced. For other panels, e.g. roof and wall panels, other minerals, however, could be used. Nevertheless, in order to provide a universal core which can be used in all of the panels, e.g. roof, wall and fire doors, the vermiculite is far superior in this regard.

Figure 7:
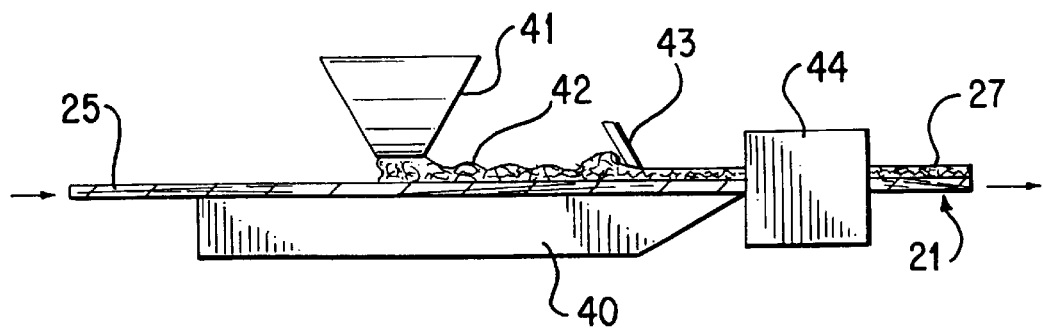
FIG. 7 is a diagrammatic illustration of apparatus for producing the present composite.

FIG. 7 shows a schematic diagram of the apparatus for producing the present composite. As shown in that figure, a web 25 is passed over a support 40 and under a feed box 41 from which a liquid dispersion 42 of the particulate vermiculite is fed onto web 25. That dispersion forms a coating on the web. The so-coated web is then passed under a doctor means 43, where the coating of the dispersion is reduced in thickness and the pressure of the doctor means causes some quantity of that dispersion to pass into the web. The so-coated web is then passed to a dryer 44, where the web is dried and the coating is set and stabilized. The dispersion 42 will contain about 5% to about 20% by weight of vermiculite. Such concentration will provide the dispersion with sufficient viscosity that most of the dispersion will remain on the surface of the web 25, and only small amounts, as discussed above, will penetrate into the web, particularly in connection with pressure exerted on the dispersion 42 by doctor means 43. The amount of vermiculite in the dispersion will depend in part upon the liquid of the dispersion, but the liquid is preferably water, and the 5% to 20% by weight of vermiculite in a water dispersion forms adequate viscosity of the dispersion to achieve the coating and penetration, as described above.

The dispersion is dried so as to set and stabilize the coating. The coated web is preferably dried at temperatures below 400° F., especially at about 350° F.

The invention will now be illustrated by the following example, where all percentages, proportions and parts are by weight, unless otherwise specified, and the percentages, proportions and parts used in the foregoing specification and claims are also by weight unless otherwise specified.

EXAMPLE 1

In this example, the web is a fiberglass web made of glass fibers having an average diameter of approximately 7 microns and an average length of approximately ¼ inch. The web is made by Lydall Manning of Troy, N.Y. and carries a designation of 1208. It has a weight of approximately 60 lbs. per 2880 square feet and is made of E-glass. The web has a 6% add-on binder of polyvinyl alcohol. The web was passed through a conventional flooding impregnator where a 10% water solution of polyvinyl alcohol saturated the web, and the web was then heated in a conventional dryer to dryness.

The vermiculite used to provide the coating is Microlite Vermiculite Dispersion obtained from W. R. Grace Construction Products. The W. R. Grace designation is Microlite HTS.

The web was passed through a conventional coating machine, as diagrammatically illustrated in FIG. 7. The dispersion of the vermiculite had 15% vermiculite and 85% water. A controller for the feed box was set so as to deposit on the web an amount of dispersion which would produce an add-on of the vermiculite (on a dried basis) of about 30%. The doctor means (43 in FIG. 7) was a knife blade extending across the entire width of the web, which width was approximately 40 inches. Other doctor means may be alternately used, i.e. rollers, bars, scrapers, weirs and the like. The particular doctor means is not critical. However, the pressure of the doctor knife, placed at an inclined angle of about 45°, was such as to cause approximately 10% of the vermiculite particles to penetrate into the web.

After applying the dispersion of vermiculite and passing the web under the doctor knife, the so-coated web passed into a conventional dryer (44 in FIG. 7) set at a temperature of 350° F. and remained in that dryer until the vermiculite coating on the web was set and stabilized, i.e. approximately 30 seconds.

The resulting composite was removed from the dryer in roll form.

A first heat-resistive core was made with the coated web composite by adhering the composite to a structural member which was made of ¾ inch thick, 32 lbs. per cubic foot, medium density fiberboard. The web was adhered to that fiberboard with a conventional phenolic resin, which was applied, set in a press and dried with added heat (added heat is not required). A second identical core member was laminated to that first core member with phenol resin, set in the press to form a laminated core (similar to that shown in FIG. 6B) of approximately 1½ inches thick. For purposes of a fire door, an additional sheet of composite of this example was adhered in a similar manner to the opposite side of the medium density fiberboard, in the manner shown in FIG. 4, in order that the fire door may be symmetrically constructed, as explained above.

The laminated core of this example was made into a fire-rated door, as shown in FIG. 2. Both the outside face 2 and the inside face 3 were made of ⅟₁₆ inch birch veneer wood. The cross bands 13 and 14 were made of same birch wood, but with the grain of the wood at 90° to the grain of the faces 2 and 3, as explained above.

The fire door showed more than adequate screw-holding power and was tested according to the ASTM standard for a 45-minute burn-through time. This standard requires that at a specified temperature, the fire cannot penetrate the door for 45 minutes and that after the 45 minutes, the door retains integrity such that it will withstand erosive effects of a high pressure fire hose (30 lbs. per square inch pressure) without penetration of the water from that fire hose through the door.

The result of this test was that no burn-through occurred in the 45 minutes and no penetration of the high-pressure fire hose occurred subsequent thereto. Thus, the door of this example meets the ASTM requirements for a 45-minute fire-rated door.

It will, therefore, be seen that the invention has achieved a considerable improvement in fire-resistant cores for combustible fire-rated panels. It will also be apparent that various modifications and variations of the invention, as described in the specific embodiments, can be utilized. It is, therefore, intended that the invention extend to the spirit and scope of the annexed claims.

What is claimed is:

1. A fire-resistant core for the use in a combustible fire-rated building panel comprising:
   (1) a wood product-containing solid structural member having a density of between about 30 and 60 lbs. per cubic foot and a thickness between about ⅟₁₆ inch and two inches;
   (2) at least one layer of fire-resistant composite attached to at least a lateral surface of the structural member, said composite comprising:
      (A) an inorganic, non-woven fibrous web having a thickness of from about 5 to 50 mils;
      (B) a web binder substantially uniformly dispersed throughout the web, the web binder being a polymeric binder; and
      (C) a substantially continuous coating on at least a lateral surface of the web of particulate vermiculite, said coating having a thickness of from about 0.5 to 10 mils and the add-ons of the vermiculite to the web being from about 10% to 50% by weight.

2. The core of claim 1, wherein the structural member is made from at least one of wood, wood particle board, wood fiber board, oriented strand wood board and timberstrand lumber.

3. The core of claim 1, wherein the composite is attached to each lateral surface of the structural member.

4. The core of claim 1, wherein the density of the structural member is from about 32 to about 40 lbs. per cubic foot.

5. The core of claim 1, wherein the thickness of the structural member is from about ¼ inch to about 1½ inches.

6. The core of claim 1, wherein the fibrous web is made from one of fibers which are glass fibers, mineral wool fibers, metal fibers, quartz fibers, graphite fibers and ceramic fibers.

7. The core of claim 6, wherein the fibers of web are made of glass.

8. The core of claim 7, wherein the glass fibers have a diameter of from about 1 to about 16 $\mu$m and a length of from about ¼ inch to about 1¼ inches.

9. The core of claim 1, wherein the web has a thickness of about 15 to 25 mils.

10. The core of claim 1, wherein the web binder is a synthetic organic polymeric binder.

11. The core of claim 10, wherein the binder is at least one of polyvinyl alcohol, polyvinyl acetate, ethylene vinyl acetate, polyacrylics, epoxy resins, polystyrene, polystyrene butadiene and amino resins.

12. The core of claim 1, wherein the web binder is water soluble or water dispersible.

13. The core of claim 1, wherein the coating has a thickness of from about 1 to about 5 mils.

14. The core of claim 1, wherein the add-ons of the vermiculite is from about 15% to 40% by weight.

15. The core of claim 14, wherein the add-ons of the vermiculite is from about 20% to 30% by weight.

16. The core of claim 1, wherein at least some amount of in-web particulate vermiculite is disposed through the web.

17. The core of claim 1, wherein the web is a wet-laid web.

18. The core of claim 1, wherein the web binder is added to the web in amounts of between about 1% and 20% of the weight of the web.

19. The core of claim 18, wherein the web binder is added to the web in amounts of between about 4% and 10% of the weight of the web.

20. The core of claim 1, wherein the web has a weight of between about 10 to 90 lbs. per 2880 square feet.

21. The core of claim 1, wherein the composite is laminated to the structural member by an adhesive.

22. The core of claim 21, wherein the adhesive is at least one of a phenolic, acrylic and olefin adhesive.

23. The core of claim 1, wherein the particulate vermiculite is in the form of high aspect ratio vermiculite platelets.

24. The core of claim 1, wherein the core is a laminate of layers of structural member and composite.

25. The core of claim 24, wherein the laminate has alternating layers of structural member and composite.

26. A method for producing the core of claim 1, comprising:
 (1) applying to a lateral surface of the web a liquid dispersion of the particulate vermiculite to form a coating on the web;
 (2) passing the coated web under a doctor wherein the coating is reduced in thickness and some quantity of the dispersion is passed into the web; and
 (3) drying the so-coated web so as to set and stabilize the coating.

27. The method of claim 26, wherein the dispersion contains about 5% to about 20% by weight of the vermiculite.

28. The method of claim 27, wherein the liquid of the dispersion is water.

29. The method of claim 28, wherein the web contains a binder.

30. A combustible fire-rated door comprising the core of claim 1.

* * * * *